Sept. 23, 1958 G. E. GARNO 2,853,570
MICROMETER BLOCK APPARATUS
Filed Aug. 2, 1955
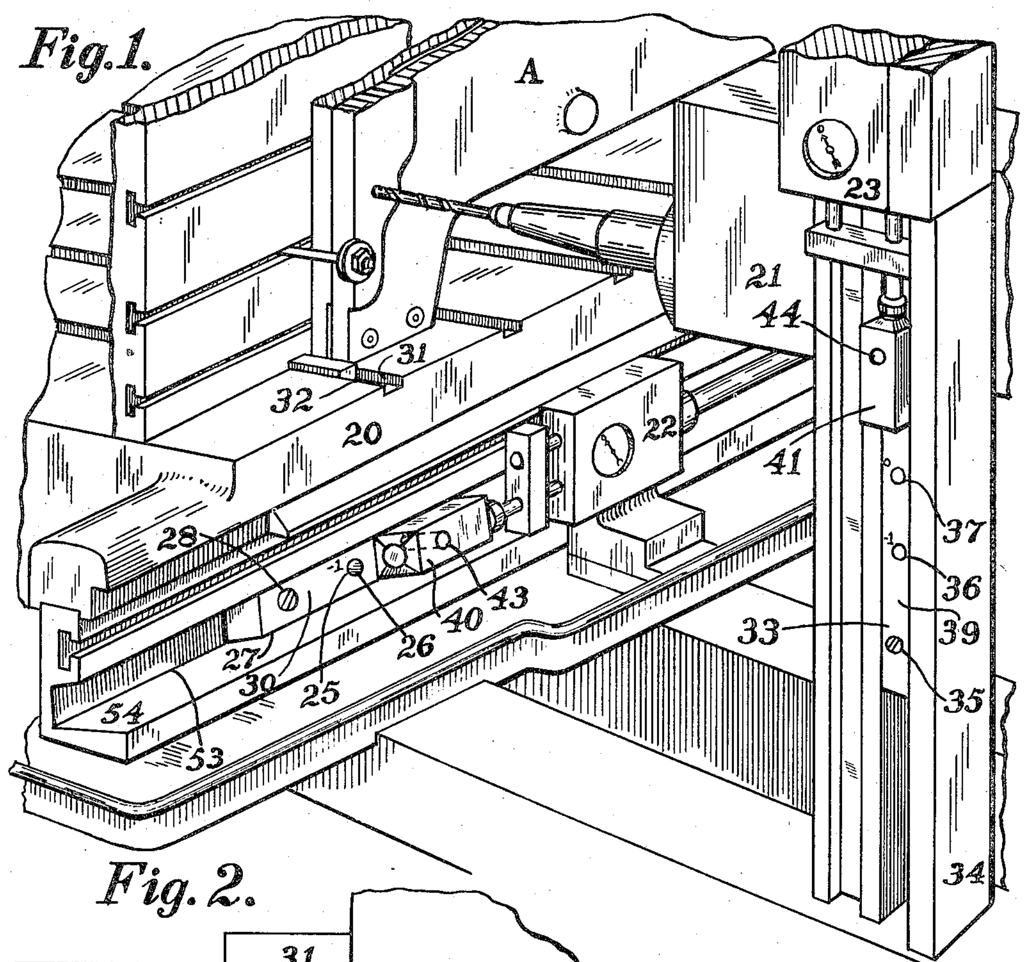
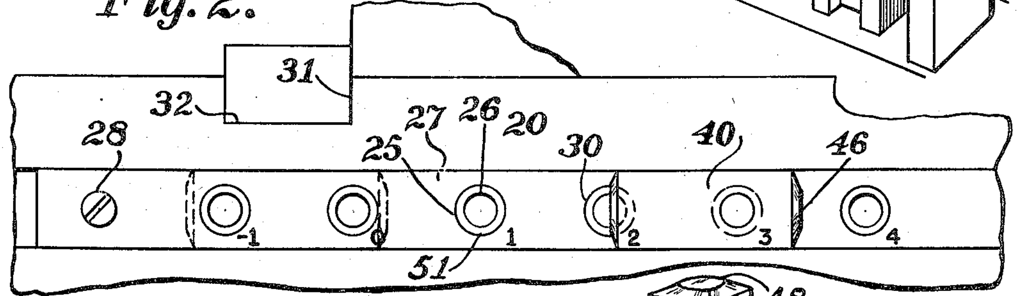
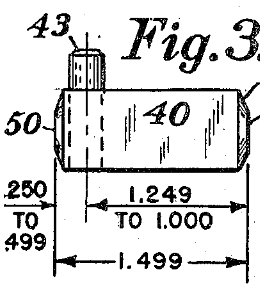
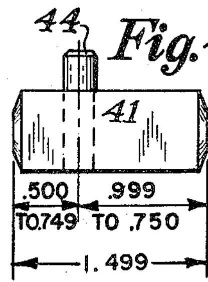
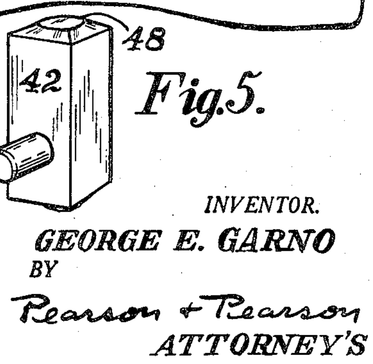
INVENTOR.
GEORGE E. GARNO
BY
Pearson & Pearson
ATTORNEY'S United States Patent Office 2,853,570

Patented Sept. 23, 1958

2,853,570

MICROMETER BLOCK APPARATUS

George E. Garno, Grafton Center, N. H., assignor to The International Paper Box Machine Company, Nashua, N. H., a corporation of New Hampshire Application August 2, 1955, Serial No. 525,878

11 Claims. (Cl. 200—61.42)

This invention relates to machine tools having automatic carriages movable to various positions and particularly to mechanism for actuating the stop controls of such carriages.

Machine tools of this type usually have both a vertically movable and a horizontally movable carriage operated by electric motors for moving the work piece relative to the tool or moving the tool relative to the work piece. A sensitive electric stop switch is provided for each carriage together with a suitable control circuit and various types of barriers have been proposed for selective placement alongside the carriages to intercept and actuate the stop switches. For example, threaded micrometers or groups of adjacent micrometer blocks supported in a trough have been used to secure a single stop location. In U. S. Patent No. 2,575,945 to De Vlieg of November 20, 1951, a detachable rod having spaced apertures and a pin selectively fitting the apertures is suggested to secure a plurality of stop locations.

By the use of a detachable apertured rod and a pin fitting the apertures, a particular rod can be zeroed in place on the machine tool and a particular work piece reproduced with accuracy and without measurement by the operator. However, it will be apparent that if two desired operations, such as drilling, are closely aligned on the work piece, there must be two apertures on the rod so close as to overlap and affect the accuracy of each other. On the other hand, if two such apertures are moved sidewise from each other, rather than being in a straight line, the pins therein will not be in the path of the stop switch. In addition the storage of elongated apertured rods of this nature, each adapted to reproduce a particular work piece, presents a problem as does the fact that time is consumed and error is possible in fixing the rods in place on the tool.

The principal object of this invention is to provide a control device formed by a fixed line of equally spaced deformations on the tool together with a detachable set of individual micrometer blocks, whereby a group of such blocks when mounted successively in appropriate deformations will reproduce a work piece without measurement by the operator.

Another object of the invention is to provide scale means alongside each movable carriage having an identical aperture at each calibration and a set of non-identical, detachable micrometer blocks, each having a pin fitting the apertures and a flat contact face on the block at a different increment of said calibrations from the pin thereof.

A further object of the invention is to provide a set of micrometer blocks each measuring a different distance from a pin fixed thereon and each having at least two flat contact faces on the block relative to the pin to give either of two desired measurements.

Still another object of the invention is to provide a set of micrometer blocks each having a round projecting integral pin adapted to closely fit identical round holes in a scale, the pin being off centre longitudinally to cause opposite ends of the block to give different measurements from the pin.

A still further object of the invention is to provide scale means on a tool having identical apertures at each calibration and a projecting side wall together with a set of micrometer blocks, each adapted to rest against or on said side wall when the integral pin thereof is in an aperture. Thus each block is prevented from turning on its pin when the pin is in an aperture, but the block and pin may be lifted and reversed to present another face in the desired direction.

Other objects and advantages of the device will be apparent from the description of the drawing, the claims and from the drawing in which Fig. 1 is a fragmentary perspective view of a portion of a horizontal movable carriage and a vertically movable carriage with a control device of this invention in place.

Fig. 2 is a front view of the portion of the horizontal carriage shown in Fig. 1 illustrating the line of equally spaced, identical, apertures of the invention.

Figs. 3 and 4 are side views of typical micrometer blocks of the invention, and

Fig. 5 is a perspective view of a typical micrometer block of this invention.

In the drawing 20 is a portion of a horizontally movable carriage of a machine tool upon which a single work piece such as a frame plate A, or a stack of identical frame plates, may be firmly clamped in any well known manner. The carriage 20 is preferably movable by power, such as an electric motor not shown, to position various areas of the work piece directly in front of a rotatable tool such as a drill. The drill or other tool is mounted on a vertically movable carriage a portion of which is shown at 21. Upon horizontally positioning the area to be machined opposite the vertical plane of the tool, the tool is then moved within that plane to the desired height, on the power driven carriage 21.

Carriage stop control means such as a sensitive electric contact switch 22 is mounted on the machine base adjacent the path of carriage 20 and a similar switch 23 is mounted on movable carriage 21, each switch being arranged to stop the carriages upon engaging a suitable barrier or actuator in the path of the switch. The showing of the work carriage 20 and tool carriage 21, as well as the switches 22 and 23 is for illustration only and the invention of this application may be used with any similar mechanism.

As heretofore stated, end measuring gauges, blocks and micrometers have been used to secure a single location for a carriage, it being necessary for the operator to perform many tasks, subject to error and inaccuracy, to secure another location. The present invention is intended to provide means for securing a plurality of locations of a carriage without measurement by the operator, without opportunity for error and with mechanism which will repeatedly duplicate the machining operation.

As shown in Figs. 1 and 2 a line 25 of identical deformations 26, each equally spaced from the other is provided, the deformations preferably being in the form of apertures of circular cross section. Preferably the deformations are formed in a rod 27 of rectangular cross section permanently attached to the carriage 20 by dowel pins 28, screws or other suitable means. The line 25 thus forms scale means 30 longitudinally of the carriage or work table and each aperture is calibrated in inches with the zero of the scale in registration with a zero line on the carriage such as a sidewall 31 of the lateral groove 32.

A rod 33, identical with rod 27 is shown, held in place on the upstanding post 34 by dowel pins such as 35 and having deformations 36 forming a vertical scale 37 similar to scale 30. The scale 30 moves with movable carriage 20 in relation to stationary switch 22 while the tool carriage 21 and switch 23 move in relation to the stationary scale 37 and post 34. It should be noted that the rods 27 and 33, with their scales formed by identical equally spaced holes are permanently attached to their respective portions of the machine and not intended to be detachable. The zero of the scale 37 formed by rod 33 is positioned at the level of the upper face of carriage 20 whereby the lower left corner of a work piece is zeroed-in when aligned with the corner of groove 32 formed by the side wall 31.

The detachable portion of the control device of the invention comprises a set of micrometer blocks each having an identical portion adapted to fit any of the deformations such as 25 and 36. When the scales 30 and 37 are in inches, preferably each micrometer block such as 40, 41 and 42 is one and 499/1000 inch in length and of uniform cross section such as square or circular. Each block is provided with an integral projecting pin such as 43, 44 or 45 arranged to fit closely in any of the apertures of the rods 27 or 33 and each block is preferably of square cross section. Each block also includes at least one flat end face such as 46, 47 or 48 spaced from the central longitudinal axis of the block pin at a predetermined distance. Preferably, however, each block such as 40 is also provided with a switch contacting flat face 50 at the end opposite the face 46 and the pin 43 is off centre whereby the block gives an obverse reading and a different reverse reading. The outer face 39 of each rod such as 27 and 33 is flat and smooth to firmly support each block when the pin thereof is inserted in an aperture such as 26.

Thus to secure increments of one thousandth of an inch it is only necessary to provide 250 blocks in the ranges shown in Fig. 3 and 250 blocks in the ranges shown in Fig. 4 or 500 blocks for each rod 27 or 33. The apertures in each rod are carefully and accurately precision machined and preferably each includes a hardened bushing such as 51 to prevent wear and maintain accuracy. Similarly the switch contacting faces 46, 47, 48 and 50 are precision machined relative to the block pins and may be beveled as at 52. The scales 30 and 37 are set in a groove such as 53 shown in Fig. 1, or associated with at least one side wall such as 54 at the level of the blocks to prevent the blocks from turning when the pins and holes are rounded.

In operation the machine tool is equipped with a fixed line of identical, equally spaced, holes calibrated into a suitable scale and mounted on the movable carriage or adjacent the path of a movable carriage depending on the location of the actuating elements of the tool. A set of nonidentical micrometer blocks is provided for the scales, each having identical integral pins to fit the holes and each having one or more faces for engaging the tool actuating elements. The faces of the blocks are at different increments of distance from the pins thereof, whereby a particular block may be selected to engage the actuating element at a particular distance between calibrations on the scale. Upon performing an initial series of operations on a work piece the operator selects one or more blocks in accordance with instructions or drawings accompanying the work order, each block upon insertion in a selected rod hole being sized to intercept, or be intercepted by the tool actuating element such as the switches 22 and 23. The blocks are suitably marked as to size and conveniently arranged in trays or racks whereby selection is simple and rapid. Having preselected the required set of blocks, the operator merely inserts the first pair in the appropriate holes in rods 27 and 33, starts the machine and the carriages automatically move the tool and work piece to the correct locations for the first machining. Upon completion thereof, the initial pair of blocks are removed, the next pair of the set inserted and the second machining operation completed. The particular set of blocks which performed the desired work on the work piece can be used again on the next similar work piece with no measurement on the part of the operator at all and the individual blocks of the set may be used any time the block dimension is called for again.

The design of the work pieces A always includes a register point at the lower left end thereof which forms a zero point from which both horizontal and vertical measurements are taken and from which dimensioning is done. For example suppose the first hole to be drilled in the work piece is dimensioned 1.375 inches horizontally and 6.041 vertically from the register point, the operator would select and insert a block such as 40 having a measurement of .375 inch in the one inch hole of the horizontal scale 30. He would also select and insert a block such as 42 having a measurement of 1.041 inches in the five inch hole on the vertical scale 37. The machine tool would then be actuated to automatically trip the stop switches for positioning the work piece and drill all in a well known manner. The minus one hole in each scale is used when a hole is to be drilled close to the zero point of a scale.

As shown in Figs. 3 and 4, 250 blocks such as 40 may be used to provide increments from .250 to .499 and, when reversed, to provide increments from 1.249 to 1.000. 250 blocks such as 41 may be used to provide increments from .500 to .749 and, when reversed, to provide increments from .999 to .750. To secure a measurement of less than .250 from a particular aperture such as a measurement of .041, a block measuring 1.041 is used and inserted in the next preceding aperture of the scale.

I claim:

1. A control device for use in a machine tool of the type having a power driven carriage and carriage stop control means, said control device comprising scale means fixed on said machine tool to define a predetermined path relative to said carriage stop control means, said scale means comprising a single line of identical, equally spaced deformations along said path, each deformation indicating a successive, equal unit of measurement therealong and a micrometer block, detachably fitted on one of said deformations, said block being one of a set of detachable, elongated, nonidentical micrometer blocks, each block having an identical integral portion fitting any of the identical deformations in said scale means and located intermediate of the length of the block and each block having at least one flat end face at one of a plurality of different distances from said identical, integral portion adapted to engage and actuate said carriage stop control means.

2. A control device as specified in claim 1 wherein said deformations are identical holes of circular cross section and the identical integral portion of each said block is an identical projecting pin of circular cross section adapted to fit in said holes.

3. A control device as specified in claim 1 wherein the identical portions of each said block fit a deformation in a plurality of angular positions and each block includes a plurality of separate, flat faces, each adapted to engage said carriage stop control means, at a different distance from the identical portion thereof.

4. A control device as specified in claim 1 wherein said deformations are identical round holes, the identical integral portion of said blocks are identical round pins fitting said holes and said blocks are of square cross section.

5. A control device as specified in claim 1 wherein each said block is slightly greater in length than the distance between an adjacent pair of units on said scale means.

6. A control device as specified in claim 1 wherein said deformations are holes, the identical, integral portion of said blocks are pins fitting said holes and each said block includes an obverse and a reverse flat end face each at a predetermined different distance from said pin to enable each block to supply two different increments of a unit of measurement.

7. A control device for use in a machine tool of the type having automatic positioning mechanism operable by a switch element movable along a straight path, said control device comprising a straight, rigid member fixed on said tool, said member having a straight smooth face with a single, straight line of round, equally spaced identical apertures therealong, parallel to, and co-extensive with, the path of said switch element and a micrometer block detachably mounted on said rigid member for actuating said switch element, said block being one of a plurality of individual elongated micrometer blocks, each having an identical integral projecting pin of round cross section intermediate of the length thereof adapted to closely fit any of said apertures and each having a flat, switch-engaging end-of-block face at one of a plurality of different distances from the pins thereof, the switch engaging face of each block extending into the path of said switch element for actuating the same when the pin of the block is inserted in any of said apertures.

8. A control device as specified in claim 7 plus an upstanding side wall, extending along said member and adapted to engage a side wall of the block mounted on said member for preventing said block from turning on the axis of said pin.

9. A control device as specified in claim 7 wherein each said block includes a switch engaging end-of-block face at each end, each at a different distance from the pin of the block whereby each block gives two measurements and the total number of required blocks is reduced one half.

10. A control device as specified in claim 7 wherein each block is of square cross section with each opposite end face flat, and said identical integral pin projects from a side face of the block intermediate of the length thereof.

11. In combination with a machine tool scale having a series of equally spaced apertures each indicating a principal unit of linear measurement, a micrometer block slightly greater in length than a single unit of scale measurement, having an integral pin projecting from intermediate of the length of a side face therefrom adapted to fit any of said apertures and having opposite, flat, end-of-block faces, each at a different predetermined distance from the centre line of said pin to provide two subordinate increments of distance between a pair of adjacent principal units on the scale.

References Cited in the file of this patent

UNITED STATES PATENTS

| | | |
|---|---|---|
| 860,553 | Martin | July 16, 1907 |
| 1,196,656 | Bugbee | Aug. 29, 1916 |
| 1,724,635 | Bath | Aug. 13, 1929 |
| 2,028,134 | Brubaker | Jan. 21, 1936 |
| 2,575,945 | De Vlieg | Nov. 20, 1951 |